United States Patent [19]

Kalogris

[11] Patent Number: 4,737,364

[45] Date of Patent: Apr. 12, 1988

[54] NUTRITIONAL DRY FOOD CONCENTRATE

[76] Inventor: Theodore P. Kalogris, 9208 Cedar Way, Bethesda, Md. 20814

[21] Appl. No.: 11,407

[22] Filed: Feb. 4, 1987

Related U.S. Application Data

[63] Continuation of Ser. No. 827,175, Feb. 6, 1986, abandoned, which is a continuation of Ser. No. 580,128, Feb. 14, 1984, abandoned.

[51] Int. Cl.⁴ .................. A61K 35/78; A61K 37/00; A61K 31/715; A61K 31/685
[52] U.S. Cl. ..................................... 424/195.1; 514/2; 514/54; 514/78; 426/74; 426/580; 426/804
[58] Field of Search .............. 424/195.1; 426/74, 580, 426/804; 514/2, 54, 78

[56] References Cited

U.S. PATENT DOCUMENTS

| | | | |
|---|---|---|---|
| 3,097,947 | 7/1963 | Kemmerer | 99/63 |
| 3,310,406 | 3/1967 | Webster | 426/74 |
| 4,089,981 | 5/1978 | Richardson | 426/164 |
| 4,251,550 | 2/1981 | Proctor | 426/72 |
| 4,298,601 | 11/1981 | Howard | 426/804 X |

OTHER PUBLICATIONS

Kellogs All–Bran, "Noforal High Fiber Cereal", Copyright 1983, Kellogs 047Co.

*Primary Examiner*—John Rollins
*Attorney, Agent, or Firm*—Dennison, Meserole, Pollack & Scheiner

[57] ABSTRACT

A highly nutritional dry food concentrate consisting entirely of plant and other non-animal natural components having a low caloric content and containing no added simple sugars. The nutritional dry food concentrate consisting entirely of natural ingredients is useful as a food supplement and in a weight reduction program.

2 Claims, No Drawings

NUTRITIONAL DRY FOOD CONCENTRATE

This is a continuation of co-pending application Ser. No. 827,175 filed on Feb. 6, 1986, now abandoned, which is a continuation of Ser. No. 580,128 filed Feb. 14, 1984, now abandoned.

BACKGROUND OF THE INVENTION

1. Field of the Invention

The present invention relates generally to nutritional dry food concentrates. In particular, the invention relates to a highly nutritional dry food concentrate consisting entirely of vegetable and other non-animal components adapted for mixing with water or other acceptable fluid food to form a liquid composition useful as a dietary supplement or in a weight reduction program.

2. Description of the Prior Art

Various dry food compositions designed primarily for mixing with water have been heretofore developed. U.S. Pat. No. 4,251,550 relates to a dry food composition comprising 20 to 50% sugar and 25 to 50% protein derived entirely from animal sources. U.S. Pat. No. 3,097,947 relates to a dry food composition comprising over 50% milk solids and 4 to 12% added simple sugar.

The U.S. Senate Select Committee on Nutrition and Human Needs has published dietary recommendations based on current scientific knowledge in "Dietary Goals for the United States", U.S. Government Printing Office, Washington, D.C., December 1977. The Senate report discusses and refers to studies concerning the relationship of nutrition and health. The dietary goals set forth therein include the following: (1) If overweight, decrease energy (caloric) intake and increase energy expenditure. (2) Increase consumption of complex carboxyhydrate. (3) Reduce consumption of refined processed simple sugars. The report suggests a decrease in consumption of animal protein is healthy, noting that one series of investigations found that ingesting sources of dietary protein derived from animal sources results in a higher plasma cholesterol level than protein sources derived from vegetable sources. This is believed to be due largely to the nature of animal fat and the significant decrease in vegetable fiber which, the report emphasizes, could be supplied by vegetable protein sources. Further, the American Cancer Society has recently launched a campaign for an anti-cancer diet, saying that Americans who consume less fat, alcohol and smoked foods and eat more vitamins, fiber and vegetables might reduce their risk of cancer.

While the prior art dry food compositions have been useful for their intended purposes, a nutritional concentrate consisting entirely of vegetable and other non-animal components which is stable, palatable, and useful as a dietary supplement or in a weight reduction program and which is consistent with the dietary goals and recommendations set forth by the U.S. Senate Select Committee on Nutrition and Human Needs is highly desirable. Thus, there is a need for a highly nutritional dry food concentrate consisting entirely of vegetable and other non-animal natural components, having a low caloric content and containing no added simple sugars.

SUMMARY OF THE INVENTION

In Accordance with the present invention there is provided a highly nutritional dry food concentrate consisting entirely of vegetable and other natural non-animal components comprising: protein, complex carbohydrates, lipids, minerals, fiber, and vitamins. The nutritional concentrate has a caloric content of not more than 120 Calories per 15 grams and contains no added simple sugars.

DESCRIPTION OF THE PREFERRED EMBODIMENTS

The highly nutritional dry food concentrate of the present invention consists entirely of plant and other natural non-animal components and comprises: protein, complex carbohydrates, lipids, minerals, fiber and vitamins. The nutritional concentrate has a caloric content of not more than 120 Calories per 15 grams and contains no simple added sugars. The dry food concentrate is mixable with water, milk, skim milk, or a fruit juice to form a liquid composition useful as a dietary supplement or in a weight reduction program. The food concentrate, when mixed with milk results in a supplement of approximately 300 Calories and 23 to 24 grams of protein, about one-third of the daily recommended allowance for protein.

The highly nutritional dry food concentrate preferably comprises: protein material providing a total protein content between 35 and 65 percent by weight; carbohydrates providing a total carbohydrate content between 10 and 20 percent by weight; lipids providing a total lipid content between 10 and 20 percent by weight and supplying between 0.4 and 0.8 grams of linoleic acid; fiber providing a total fiber content between 2 and 10 percent by weight; and vitamins and minerals together providing a total vitamin and mineral content between 5 and 20 percent by weight. Any acceptable form of the minerals (Zn, Cu, Fe, Mg, Mn or Se) may be used, such as the amino acid chelates.

In a highly preferred embodiment, the dry nutritional food concentrate comprises protein material providing a minimum total protein content of at least 50 percent by weight. Highly preferred is a minimum total fiber content of at least 4 percent by weight.

The nutritional concentrate of the present invention preferably has a caloric content of not more than 90 Calories per 15 grams. In a highly preferred embodiment, the nutritional concentrate has a caloric content of not more than 70 Calories per 15 grams.

All components of the dry food concentrate of the invention must be derived from non-animal sources. For example, the protein in the dry food concentrate preferably is derived from non-animal sources such as soy protein isolate, brewer's yeast or a combination thereof. Further, the lipids in the dry food concentrate must be derived from nonaminal sources. Such sources may include any polyunsaturated vegetable oil or mixture of such oils which contain between 30 and 60% of the essential fatty acid linoleic acid. Preferred sources include soybean oil and vegetable derived lecithin such as soy lecithin. A preferred source for carbohydrate and fiber is psyllium seed husks.

Optionally, the nutritional dry food concentrate further comprises herbs, such as garlic, licorice root, psyllium seed, cayenne, kelp, blue vervain, and rhubarb root; natural flavoring agents derived from concentrating the flavor components of naturally occurring plants such as coconut, strawberry, carob, the vanilla bean and others; and proteolytic enzymes such as papain (derived from pineapple), bromelain (derived from papaya) or other proteolytic enzymes obtained from non-animal sources generally accepted as safe.

Each serving unit (15 grams) of the dry nutritional concentrate preferably provides the following amounts and percentages of U.S. recommended daily allowance (U.S. RDA):

| | | | |
|---|---|---|---|
| Vitamin A | 5,000 | IU | = 100% |
| Vitamin D | 400 | IU | = 100% |
| Vitamin E | 60 | IU | = 100% |
| Vitamin C | 480 | mg | = 800% |
| Thiamine (B1) | 3.0 | mg | = 200% |
| Riboflavin (B2) | 4.2 | mg | = 250% |
| Niacin | 20 | mg | = 110% |
| Vitamin B6 | 4 | mg | = 200% |
| Vitamin B12 | 18 | mcg | = 300% |
| Folic Acid | 400 | mcg | = 100% |
| Panthenoic Acid | 20 | mg | = 200% |
| Biotin | 300 | mcg | = 100% |
| Calcium | 300 | mg | = 30% |
| Phosphorus | 250 | mg | = 25% |
| Magnesium | 200 | mg | = 50% |
| Iron | 18 | mg | = 100% |
| Zinc | 16 | mg | No established RDA |
| Copper | 2 | mg | No established RDA |
| Iodine | 150 | mg | = 100% |
| Selenium | 100 | mcg | = 50% |

The protein of the subject dry nutritional food concentrate preferably has a biological protein efficiency value not less than 90% of that of casein determined by standard official methods. Individual amino acids may be added according to current regulations, as necessary to achieve this value by methods well known in the art.

The mixture is conveniently packaged in a water impervious container containing approximately 1 pound or 454.5 grams of the dry food concentrate, the equivalent of about 30 serving units.

Each serving unit of the nutritional food concentrate (15 grams) supplies about 7.5 grams protein, about 2 grams carbohydrates, about 2 grams lipids, and about 0.8 grams of non-digestible fiber.

When preparing the nutritional dry food concentrate of the invention for use, 8 ounces of cold water, milk, skim milk, or a fruit juice are poured into a shaker or a blender with a suitable lid and 1½ teaspoons (one serving unit) of the nutritional dry food concentrate is added thereto. The nutritional dry food concentrate and aqueous liquid are shaken for 30 seconds or mixed in a blender for about 10 seconds to form an aqueous dispersion. Alternatively, the aqueous dispersion can be formed by thoroughly mixing with a spoon the aqueous liquid to which the nutritional dry food concentrate has been added.

The resulting aqueous dispersion is a highly palatable drink consisting entirely of vegetable and other nonaminal natural components.

The following specific examples exemplify the present invention:

EXAMPLE 1

The ingredients for the nutritional dry food concentrate and the proportions used for a 15 gram weight basis are as follows (amounts indicated may vary between 50 and 200% of that given, depending upon intended use—supplement or diet):

| Ingredients | Serving Unit 15 grams 60 calories |
|---|---|
| Soy Protein Isolate, | 9 g |
| Brewer's Yeast, | 1 g |

-continued

| Ingredients | Serving Unit 15 grams 60 calories |
|---|---|
| Dolomite, | 1 g |
| Di-Calcium Phosphate, | 300 mg |
| Ascorbic Acid, | 400 mg |
| Powdered Psyillium Husks, | 600 mg |
| Soybean Oil, | 2.0 g |
| Soy Lecithin, | 0.45 g |
| Methionine, | 80 mg |
| Magnesium Oxide, | 100 mg |
| Tryptophane, | 50 mg |
| Rose Hips, | 40 mg |
| Licorice Root (*Glycyrrhiza Glabra*), | 50 mg |
| Cayenne (*Capiscum Annum*), | 30 mg |
| Garlic (*Allium Sativum*), | 40 mg |
| Rhubarb (*Rheam Officinale*), | 40 mg |
| Dried Kelp (*Fucus Vesiculosis*), | 20 mg |
| Papain, | 5 mg |
| Bromelain, | 5 mg |
| Folic Acid, | 400 mcg |
| Thiamine HCL, | 3.4 mg |
| Biotin, | 300 mcg |
| Riboflavin, | 4.2 mg |
| Vitamin E (d-Alpha Tocopherol Acetate), | 50 mg |
| Pyridoxine, | 5 mg |
| Vitamin A, | 1.7 mg |
| Vitamin D, | 12.0 mcg |
| Niacinamide, | 20 mg |
| Calcium Pantothenate, | 240 mg |
| Vitamin B-12 (Cyanocobalamin) | 18 mcg |
| Cupric Gluconate, | 12 mg |
| Ferrous Fumerate, | 50 mg |
| Zinc Gluconate and | 100 mg |
| Potassium Chloride. | 200 mg |

The dry food concentrate generally is prepared in powder form as illustrated by the following procedure:
1. Formulations of the requisite amounts of the ingredients are mixed separately as follows:
    (a) Formulation #1—Oily components
        Soybean oil (or alternative component oils)
        Lecithin
        Oil soluble vitamins A, D and E
    (b) Formulation #2—Herbal and enzyme components
        Licorice root
        Rose hips
        Powdered psyllium seed husks
        Papain
        Rhubarb
        Garlic
        Bromaline
        Cayenne
        Kelp
    (c) Formulation #3—Water soluble vitamins, minerals and amino acids
        Mineral salts (including dolomite)
        Amino acids
        All remaining vitamins
2. The above formulations are added, in order, to a mixer or blender containing the remaining ingredients:
    Soy protein isolate
    Dried brewer's yeast
    Flavoring
    The mixture is blended sufficiently to provide a high degree of uniformity.
3. The finished product is loaded into appropriate bulk containers, labeled, sampled for quality control, and subsequently packaged and labeled for commercial distribution.

EXAMPLE 2

Illustration of the utility of the food concentrate in a weight reduction program.

Subjects A–F participated in a 60 day weight reduction program. Each subject was initially weighed. Each subject, 2–3 times daily, mixed an amount gradually increasing to one serving unit of the food concentrate of the invention with a beverage of their choice. Preferred beverages are available from the Royal American Food Co., Blue Springs, MO, and include the following Royal American Beverage Products: American Gold Imitation Low Fat Dry Milk, Cocoa Flavored Beverage, Orange Flavored Beverage, and High Protein Beverage. Optionally, additional vitamin C crystals were added to the beverages containing the food concentrate of the invention. Each subject daily consumed a Royal American dinner of their choice, available from the Royal American Food Co., or alternatively, a carefully weighed meat portion, with a salad and a low calorie dressing. Each subject was also given a specially prepared pure fiber honey wafer as an appetite appeaser and to assure ample fiber intake. Each subject was encouraged to drink 8 glasses of spring water daily. Each subject experienced a significant weight loss over the course of the 60 day program as illustrated below.

| Subject | Initial Weight | Weight After 60 day Reduction Program |
|---|---|---|
| A | 152 | 135 |
| B | 142 | 116 |
| C | 175 | 155 |
| D | 135 | 120 |
| E | 142 | 126 |
| F | 172 | 149 |

The invention has been described in detail with particular reference to certain preferred embodiments thereof, but it will be understood that variations and modifications can be effected within the spirit and scope of the invention.

What is claimed is:

1. In a highly nutritional vegetarian dry food supplement consisting essentially of vegetable protein selected from the group consisting of soy protein isolate, brewer's yeast and an admixture thereof providing a total protein content between 35 and 65 percent by weight, a total complex carbohydrate content between 10 and 20 percent by weight and fiber content of at least 4 percent by weight, vegetable lipids selected from the group consisting of polyunsaturated vegetable oil and vegetable derived lecithin providing a total lipid content between 10 and 20 percent by weight, minerals and vitamins, said vitamins and minerals together providing a total vitamin and mineral content between 5 and 20 percent by weight, said nutritional supplement having a caloric content of not more than 120 calories per 15 grams, the improvement comprising said supplement deriving said complex carbohydrate and fiber content, solely from psyllium husks and containing no animal derived components and no added simple sugars.

2. A method of reducing dietary deficiency in a human which comprises the steps of providing the human with a vegetarian complex carbohydrate-fiber-containing dietary supplement according to claim 1 suspended in a potable liquid so as to provide a nutritional supplement having a caloric content of not more than 120 calories per 15 grams and containing no animal derived components and no added simple sugars.

* * * * *